United States Patent [19]

Hoeschele

[11] 3,954,689

[45] May 4, 1976

[54] SEGMENTED THERMOPLASTIC COPOLYESTER ELASTOMERS

[75] Inventor: Guenther Kurt Hoeschele, Wilmington, Del.

[73] Assignee: E. I. Du Pont de Nemours and Company, Wilmington, Del.

[22] Filed: Dec. 10, 1973

[21] Appl. No.: 423,019

[52] U.S. Cl. ............................ 260/22 D; 260/75 R; 260/860
[51] Int. Cl.² ......................................... C08L 91/00
[58] Field of Search ................ 260/75 R, 860, 22 D

[56] References Cited
UNITED STATES PATENTS

| | | | |
|---|---|---|---|
| 3,235,520 | 2/1966 | Crowell | 260/22 D |
| 3,383,343 | 5/1968 | Mohajer, et al. | 260/22 D |
| 3,390,108 | 6/1968 | Keck, et al. | 260/22 D |
| 3,668,277 | 6/1972 | Riemhofer | 260/75 R X |
| 3,682,863 | 8/1972 | McHale | 260/75 R |
| 3,763,109 | 10/1973 | Witsiepe | 260/75 R |
| 3,784,520 | 1/1974 | Hoeschele | 260/75 R |
| 3,795,644 | 3/1974 | Jackson et al. | 260/22 D |

Primary Examiner—Murray Tillman
Assistant Examiner—W. C. Danison, Jr.

[57] ABSTRACT

Segmented thermoplastic copolyester elastomers containing recurring polymeric long chain ester units derived from dimer acid and low molecular weight glycols and short chain ester units derived from dicarboxylic acids and low molecular weight glycols. At least 70% of the dicarboxylic acid used is terephthalic acid and at least 70% of the low molecular weight glycol is 1,4-butanediol. The short chain ester units constitute about 25–95% by weight of the polymer. Such copolyesters rapidly harden from the molten state and have outstanding resistance toward heat aging and photodegradation.

9 Claims, No Drawings

SEGMENTED THERMOPLASTIC COPOLYESTER ELASTOMERS

BACKGROUND OF THE INVENTION

Linear copolyesters have been produced heretofore for various purposes, particularly for the production of films and fibers, but the known polymers of this type have not been as effective as would be desired for certain applications. In particular, certain polymers of this type did not possess superior tear strength, flex life, abrasion resistance and rapid hardening rates which would be required for many uses such as hydraulic hose and cable coverings. Recently, copolyetheresters have been discovered which possess such properties. Although these copolyetheresters are significantly superior to those previously known in the art, in many regards, they have presented a problem with regard to resistance of the polyether backbone toward oxidative degradation. That is to say, with prolonged exposure to temperatures above about 120°C. or sunlight the copolyetherester has tended to degrade. For many applications requiring good heat aging or weathering characteristics there has been a need for a high performance thermoplastic elastomer combining rapid hardening rates with superior resistance toward oxidative degradation.

SUMMARY OF THE INVENTION

According to this invention there is provided a thermoplastic copolyester composition which has greatly enhanced resistance toward oxidative degradation of the polymer, consisting essentially of a multiplicity of recurring intralinear long chain and short chain ester units connected head-to-tail through ester linkages, said long chain ester units being represented by the following structure:

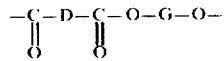

(a)

and said short chain ester units being represented by the following structure:

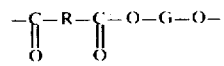

(b)

wherein:

D is a divalent radical remaining after removal of terminal carboxyl groups from dimer acid having a molecular weight of about 565;

R is a divalent radical remaining after removal of carboxyl groups from a dicarboxylic acid having a molecular weight less than about 300; and G is a divalent radical remaining after removal of hydroxyl groups from a low molecular weight glycol having a molecular weight less than about 250;

with the provisos that the short chain ester units constitute about 25–95°% by weight of the copolyester; at least about 70% of the R groups must be 1,4-phenylene radicals, at least about 70% of the G groups must be 1,4-butylene radicals; the sum of the percentages of the R groups which are not 1,4-phenylene radicals and of the G groups which are not 1,4-butylene radicals cannot exceed about 30% and said copolyester has a melt viscosity of at least 2,500 poise at 250°C.

DETAILED DESCRIPTION

The term "long chain ester units" as applied to units in a polymer chain refers to the reaction product of dimer acid having a molecular weight of about 565 with a low molecular weight glycol. Such "long chain ester units," which are a repeating unit in the copolyesters of this invention, correspond to the formula (a) above. Dimer acid is the dimerization product of unsaturated $C_{18}$ fatty acids such as linoleic and linolenic acid or esters thereof. The preparation and structure of the dimerized fatty acid is described in J.Am.Chem.Soc. 66,84 (1944) and in U.S. Pat. No. 2,347,562, both of which are herein incorporated by reference. Several grades of dimer acids are available from commercial sources which vary in the degree of unsaturation and monomer and trimer content. The preferred dimer acid compositions are substantially free of monomer and trimer fractions and are fully saturated. A high quality grade of dimer acid meeting these requirements is commercially available under the trade name Empol 1,010 from Emery Industries, Inc. Lower grades of dimer acid containing a low level of unsaturation and trimer — as represented by Empol 1,014 — are also suitable for the preparation of the copolyesters of this invention. In this case it is advantageous to compensate for the trimer content of the dimer acid — which should not exceed 15% by weight — by using an equivalent amount of monofunctional fatty acid or long chain alcohol as a polymerization modifier to prevent the formation of highly branched or crosslinked polymers. Representative monofunctional fatty acids are stearic and palmitic acid, long chain alcohols include lauryl and octadecyl alcohol. Principally, any monofunctional carboxylic acid or alcohol can be used in melt condensation polymerizations as long as its vapor pressure is not much higher than that of the particular low molecular glycol employed.

The low molecular weight glycols (below about 250) which are reacted with the foregoing dimer acid to form long chain ester units are acyclic and alicyclic dihydroxy compounds. Besides 1,4-butane diol glycols with 2–15 carbon atoms such as ethylene, propylene, isobutylene, pentamethylene, 2,2-dimethyltrimethylene, hexamethylene and decamethylene glycols, dihydroxy cyclohexane, cyclohexane dimethanol, etc. are preferred. Especially preferred are aliphatic glycols containing 2–8 carbon atoms. Aromatic dihydroxy compounds such as resorcinol, hydroquinone, and bis(p-hydroxyphenyl) propane may also be used. Equivalent ester-forming derivatives of glycols are also useful (e.g., ethylene oxide or ethylene carbonate can be used in place of ethylene glycol). The term "low molecular weight glycol" as used herein should be construed to include such equivalent ester-forming derivatives; provided, however, that the molecular weight requirement pertains to the glycol only and not to its derivatives.

The term "short chain ester units" as applied to units in a polymer chain refers to low molecular weight compounds or polymer chain units having molecular weights less than about 550. They are made by reacting a low molecular weight glycol (as defined above) with a dicarboxylic acid to form ester units represented by formula (b) above.

Dicarboxylic acids (other than terephthalic acid) which are reacted with dimer acid and low molecular weight glycols to produce the copolyesters of this invention are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the elastomeric compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as $-O-$ or $-SO_2-$.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylenebis(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl) methane, p-oxy(p-carboxyphenyl) benzoic acid, ethylene-bis(p-oxybenzoic acid) 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid and $C_1-C_{12}$ alkyl and ring substitution derivatives thereof, such as halo, alkoxy, and aryl derivatives. Hydroxyl acids such as p($\beta$-hydroxy-ethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., phthalic and isophthalic acids.

It is essential that at least about 70 mole percent of the dicarboxylic acid incorporated into the polymer be terephthalic acid and at least about 70 mole percent of the low molecular weight diol incorporated into the polymer be 1,4-butanediol. Thus, at least 70% of the R groups in formula (b) above are 1,4-phenylene radicals and at least about 70% of the G groups in formulae (a) and (b) above are 1,4-butylene radicals. A further requirement in making the polymers of this invention is that the sum of the percentages of the R groups which are not 1,4-phenylene radicals and of the G groups which are not 1,4-butylene radicals cannot exceed about 30%. For example, if 30% of the low molecular weight diol molecules used are other than 1,4-butanediol, then all of the dicarboxylic acid used must be terephthalic acid, or if 15% of the low molecular weight diol molecules used are other than 1,4-butanediol, then at least about 85% of the dicarboxylic acid used must be terephthalic acid. Copolyesters having fewer 1,4-butylene terephthalate units than is assured by the foregoing proportions do not have sufficiently rapid hardening rates. The G and R units which are not 1,4-butylene and 1,4-phenylene, respectively, can be derived from any of the low molecular weight diols or dicarboxylic acids named above.

The copolyesters of this invention contain about 25–95% by weight of short chain ester units corresponding to formula (b) above, the remainder being long chain ester units corresponding to formula (a) above. When the copolyesters contain less than about 25% by weight short chain units, the physical properties of the copolyesters fall to undesirably low levels and when the copolyesters contain more than about 95% short chain units, the low temperature properties worsen and the copolyesters become less elastomeric. The optimum balance of properties is obtained when the short chain ester content is about 45–75%.

The preferred copolyesters of this invention are those prepared from dimethyl terephthalate, 1,4-butanediol and dimer acid. Optionally a portion of the dimethyl terephthalate may be substituted by dimethyl phthalate or dimethyl isophthalate.

Although the melting points of the harder copolyesters can be as high as 220°C. polymer compositions melting between 150° and 200°C. are normally preferred because of their lower processing temperatures. Copolyesters containing two different short chain ester units usually have melting points below 200°C.

The polymers described herein can be made conveniently by a conventional ester interchange reaction. A preferred procedure involves heating the dimethyl ester of terephthalic acid, dimer acid and a molar excess of 1,4-butanediol in the presence of a catalyst at 150° to 260°C. followed by distilling off methanol formed by the interchange. Heating is continued until methanol evolution is complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the dimer acid can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight glycol, as above, or from the free acids with the diol acetates. Alternatively, the short chain ester copolymer can be prepared by direct esterification from appropriate acids, anhydrides or acid chlorides, for example, with glycols or by other processes such as reaction of the acids with cyclic ethers or carbonates. Obviously the prepolymer might also be prepared by running these processes in the presence of the dimer acid.

The resulting prepolymer is then carried to high molecular weight by distillation of the excess of short chain diol. This process is known as "polycondensation." Additional ester interchange occurs during this distillation to increase the molecular weight and to randomize the arrangement of the copolyester units. Best results are usually obtained if this final distillation or polycondensation is run at less than 1 mm. pressure and 240°–260°C. for less than 2 hours in the presence of antioxidants such as 4,4'-bis($\alpha,\alpha$-dimethylbenzyl)-diphenyl amine.

In order to obtain a satisfactory level of physical properties a minimum degree of polymerization is required. A measure for the degree of polymerization is the melt viscosity of the polymer at the process temperature which can be conveniently determined by an in-line viscosimeter. It was found that the melt viscosity of the copolyesters during the preparation should reach at least 2,500 poise at 250°C., preferably 10,000 poise or higher.

Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as Mg[HTi(OR)$_6$]$_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight glycols for example, butanediol in terephenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer prepration. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess good resistance toward heat aging and photodegradation, it is advisable to stabilize these compositions by incorporating antioxidants in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4'-bis(2,6-ditertiary-butylphenol),1,3,5-trimethyl-2,4,6-tris[3,5-ditertiary-butyl-4-hydroxybenzyl] benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include 4,4'-bis($\alpha,\alpha$-dimethylbenzyl)diphenylamine, N,N'-bis(beta-naphthyl)-p-phenylenediamine, N,N'-bis(1-methylheptyl)-p-phenylene diamine and either phenyl-betanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obtained by blending hard and soft polyesters of this invention.

The copolyesters of this invention have superior physical properties. They are particularly outstanding in their retention of physical properties at elevated temperatures and their resistance toward heat aging and photodegradation. Because of their rapid hardening rates, they are especially effective in injection molding applications and their relatively low melt viscosity, excellent thermal stability at processing temperature, rapid hardening rates, good flow and mold wetting characteristics, and relative insensitivity to moisture allow the polymers of this invention to be processed by substantially all procedures which have been used for thermoplastics in general and, in many instances, they offer significant processing advantage over competitive thermoplastic polymers. The materials can be injection, compression, transfer and blow molded to form elastic molded articles (such as tires), which may include inserts, if desired, meeting close tolerances. They can be readily extruded to produce films (blown or unblown), tubing, other forms having complicated cross sections, and cross-head extruded for hose, wire, cable and other substrate covers. They can be readily calendered to produce films and sheeting or to produce calender-coat woven and non-woven fabrics and other substances. Illustrative uses of the compositions include hydraulic hose tubes and covers, wire and cable insulation and gaskets requiring high service temperatures.

In finely divided form, the polymers of this invention offer the above-mentioned processing advantages for procedures employing powdered thermoplastics. In addition, they can be used in crumb form. The unique flow characteristics of these polymers give excellent definition on molded surfaces and facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber and heat-fused coating (for flexible substrates).

The melt viscosity and stability characteristics of these polymers offer advantages for use in certain coating and adhesive procedures such as dip, transfer, roller and knife-coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendering operations and allows penetration into the substrate, if desired.

All parts, proportions and percentages disclosed herein are by weight unless otherwise indicated. The following examples further illustrate the invention.

The following ASTM methods are employed in determining the properties of the polymers prepared in the examples which follow:

| | |
|---|---|
| Modulus at 100% elongation,* $M_{100}$ | D 412 |
| Modulus at 300% elongation,* $M_{300}$ | D 412 |
| Modulus at 500% elongation,* $M_{500}$ | D 412 |
| Tensile at Break,* $T_B$ | D 412 |
| Elongation at Break,* $E_B$ | D 412 |
| Hardness, Shore D | D 1484 |
| Heat Aging** | D 865 |
| Weather-O-Meter Aging | D 750 |
| Melt Index*** | D 1238 |

*Cross-head speed 20"/minute if not stated otherwise.
**All heat aging experiments were carried out with dumbbell shaped test specimens as described in ASTM D 412. If not stated otherwise, the thickness of the test specimens was 45-48 mil.
***2160 g load, drying conditions: 1 hour at 135°C./0.2 mm Hg.

The inherent viscosity is determined at a concentration of 0.1 g/dl in m-cresol at 30°C. and is expressed in dl/g.

The useful polymer life at the specified aging temperatures is determined by the 180° bend test. In this test the dumbbell shaped test specimen as described in ASTM method D 412, is removed from the heat aging tubes and kept at room temperature for about 10 minutes. Then the dumbbell is bent first in one direction until its ends touch each other and then bent in the opposite direction until the ends touch again. If the test specimen breaks during this procedure, it is said to have failed in the 180° bend test.

Catalyst

To 425 parts of anhydrous 1,4-butanediol in a round bottom flask is added 23.32 parts of tetrabutyl titanate. The mixture is agitated at 50°C. for 2-3 hours until the small amount of solids originally present disappear.

EXAMPLE 1

A. The following materials are placed in a 5 liter flask fitted for distillation:

| | |
|---|---|
| Dimer Acid (Empol 1010) | 380 parts |
| Dimethyl terephthalate | 700 parts |
| 1,4-Butanediol | 550 parts |
| 4,4'-Bis(α,α-dimethylbenzyl)diphenylamine | 20 parts |
| Catalyst | 25 parts |

A stainless steel stirrer with a paddle cut to conform with the internal radius of the flask is positioned about one-eighth inch from the bottom of the flask and agitation is started. The flask is placed in an oil bath at 160°C., agitated for five minutes and then the catalyst is added. Methanol distills from the reaction mixture as the temperature is slowly raised to 250° C. over a period of 1 hour. When the temperature reaches 250°C., the pressure is gradually reduced to 0.35 mm Hg within 20 minutes. The polymerization mass is agitated at 250°C./0.15 mm Hg for 54 minutes. Then the polycondensation polymerization is discontinued and the resulting viscous molten product is scraped from the flask in a nitrogen (water and oxygen free) atmosphere and allowed to cool. The resulting polymer has an inherent viscosity of 0.94 dl/g and a melt index of 5.44 g/10 min. measured at 220°C.

B. For control purposes, the preparation of Copolyester A is substantially repeated except that the following materials are used:

| | |
|---|---|
| Poly(tetramethylene oxide) glycol, number average molecular weight 975 | 428 parts |
| Dimethyl terephthalate | 740 parts |
| 1,4-Butanediol | 430 parts |
| 4,4'-Bis(α,α-dimethylbenzyl)diphenylamine | 24.5 parts |
| Catalyst | 25 parts |

The resulting copolyester has an inherent viscosity of 1.35 dl/g and a melt index of 6.5 g/10 min. at 220°C.

Forty-five mil slabs are compression molded at 240°C. from both polymer compositions. The physical properties are shown in Table I.

TABLE I

| Room Temperature Properties | Polymer A | Control Polymer B |
|---|---|---|
| Polymer melt temperature,*°C. | 195 | 202 |
| Tensile strength, psi | 6000 | 5000 |
| Elongation at break, % | 620 | 600 |
| 100% Modulus, psi | 2130 | 2190 |
| 300% Modulus, psi | 2450 | 2410 |
| 500% Modulus, psi | 4000 | 3560 |
| Hardness, Shore D | 56 | 55 |
| 150°C. Properties | | |
| Tensile strength, psi | 2060 | 2250 |
| Elongation at break, % | 585 | 610 |
| 100% Modulus, psi | 450 | 500 |

*Determined by differential scanning calorimetry.

It is evident that the Polymer Composition A of this example exhibits the same high level of physical properties as Control Polymers B which contains a polyether soft segment. However, the two copolyesters differ greatly in their resistance toward oxidative degradation caused at elevated temperatures or under the influence of ultraviolet radiation as shown in Table II.

TABLE II

| | Polymer A | Control Polymer B |
|---|---|---|
| Properties After Heat Aging at 150°C. for: | 49 days | 24 days |
| Tensile strength, psi | 2450 | too degraded for testing |
| Elongation at break, % | 90 | |
| Polymer life* at 150°C., days | 84 | 24 |
| Properties** After 200 Hours Weather-O-Meter Exposure | | |
| Tensile strength, psi | 2550 | 2200 |
| Elongation at break, % | 290 | 60 |

TABLE II-continued

| | Polymer A | Control Polymer B |
|---|---|---|
| 100% Modulus, psi | 2350 | — |
| Appearance | No surface cracking when flexed | Severe surface cracking when flexed |

*Based on 180° bend test.
**Obtained with 80 mil dumbbells, crosshead speed 2"/min.

The results shown in Table II clearly show the superiority of Polymer A in respect to resistance toward heat aging and photodegradation over polyether derived copolyester (Control Polymer B).

EXAMPLE 2

The melt polymerization procedure described in Example 1 is essentially repeated except that a lower grade of dimer acid — commercially available from Emery Industries as Empol 1014 — was used instead of Empol 1010. To compensate for the higher trimer acid content of Empol 1014 a small amount of stearic acid (8.0 g) is added with the other starting materials. The resulting copolyester has an inherent viscosity of 0.92 dl/g and a melt index of 3.66 g/10 min. at 220°C.

46 mil dumbbells of above polymer and Control polymer of Example 1 are heat aged at 177°C. for 3 days. The physical properties of both compositions before and after heat aging are summarized in Table III.

TABLE III

| Original Properties | Polymer of This Example | Control Polymer 1B |
|---|---|---|
| Tensile strength, psi | 3400 | 5000 |
| Elongation at break, % | 460 | 600 |
| 100% Modulus, psi | 2300 | 2190 |
| 300% Modulus, psi | 2500 | 2410 |
| Hardness, Shore D | 56 | 55 |
| Properties After Heat Aging for 3 Days at 177°C. | | |
| Tensile strength, psi | 3000 | 2000 |
| Elongation at break, % | 120 | <10 |
| Polymer life* at 177°C., days | 9 | 4 |

*Based on 180° bend test.

EXAMPLE 3

The polymerization procedure of Example is essentially repeated except that the following starting materials are used:

| | | |
|---|---|---|
| Dimer Acid (Empol 1010) | 11.0 | parts |
| Dimethyl terephthalate | 40.1 | parts |
| Dimethyl phthalate | 4.01 | parts |
| 1,4-Butanediol | 35.0 | parts |
| 4,4'-Bis(α,α-dimethylbenzyl) diphenylamine | 0.9 | parts |
| Catalyst | 1.35 | parts |

The resulting copolyester has an inherent viscosity of 1.11 dl/g and melting point of 195°C. (determined by differential scanning calorimetry).

Typical stress-strain properties of compression molded polymer obtained at a crosshead speed of 2 inch/min. are shown in Table IV.

TABLE IV

| | |
|---|---|
| Tensile strength, psi | 6030 |
| Elongation at break, % | 500 |
| 100% Modulus, psi | 2560 |
| 300% Modulus, psi | 3600 |

EXAMPLE 4

A copolyester is prepared according to the procedure given in Example 1 from the following starting materials:

| | | |
|---|---|---|
| Dimer Acid (Empol 1010) | 480 | parts |
| Dimethyl terephthalate | 600 | parts |
| Dimethyl phthalate | 49.8 | parts |
| 1,4-Butanediol | 550 | parts |
| 4,4'-Bis(α,α-dimethylbenzyl) diphenylamine | 20 | parts |
| Catalyst | 25 | parts |

The resulting condensation polymer has melt index of 4.0 g/10 min. at 200°C. and a polymer melting point of 171°C.

Physical properties of compression molded polymer is shown in Table V.

TABLE V

| | |
|---|---|
| Tensile strength, psi | 2750 |
| Elongation at break, % | 550 |
| 100% Modulus, psi | 1475 |
| 300 Modulus, psi | 1760 |

What is claimed is:

1. A segmented thermoplastic copolyester elastomer which is suitable for injection molding and exhibits high elasticity at break, consisting essentially of a multiplicity of recurring long chain ester units and short chain ester units joined head-to-tail through ester linkages, said long chain ester units being represented by the formula

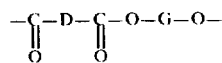

and said short chain units being represented by the formula

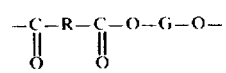

where D is a divalent radical remaining after the removal of terminal carboxyl groups from dimer acid having a molecular weight of about 565; R is a divalent radical remaining after removal of carboxyl groups from a dicarboxylic acid having a molecular weight less than about 300 and G is a divalent radical remaining after removal of hydroxyl groups from a glycol having a molecular weight less than 250; provided, a. said short chain ester units amount to about 45–75% by weight of said copolyester,
b. at least about 70% of the R groups in formula (II) are 1,4-phenylene radicals and at least about 70% of the G groups in formulae (I) and (II) are 1,4-butylene radicals,
c. the sum of the percentages of R groups which are not 1,4-phenylene radicals and of G groups which are not 1,4-butylene radicals does not exceed about 30, and
d. said copolyester has a melt viscosity of at least 2500 poise at 250°C.

2. The composition of claim 1 in which the dimer acid is substantially free of monomer and trimer fractions and is substantially saturated.

3. The composition of claim 1 in which the dimer acid contains a maximum of 15% by weight of trimer and an approximately equivalent amount of a monofunctional fatty acid as a polymerization modifier.

4. The composition of claim 1 in which the copolyester has a melt viscosity of at least 10,000 poise at 250°C.

5. A segmented thermoplastic copolyester of claim 1 having a melting point of less than 200°C.

6. The segmented thermoplastic copolyester of claim 5 wherein substantially all of the dicarboxylic acid reactant is terephthalic acid.

7. The segmented thermoplastic copolyester of claim 5 wherein the dicarboxylic acid reactant is a mixture of terephthalic acid and isophthalic acid.

8. The segmented thermoplastic copolyester of claim 5 wherein the dicarboxylic acid reactant is a mixture of terephthalic acid and phthalic acid.

9. The segmented thermoplastic copolyester of claim 5 wherein substantially all of the glycol having a molecular weight less than 250 is 1,4-butanediol.

* * * * *